United States Patent Office 3,819,779
Patented June 25, 1974

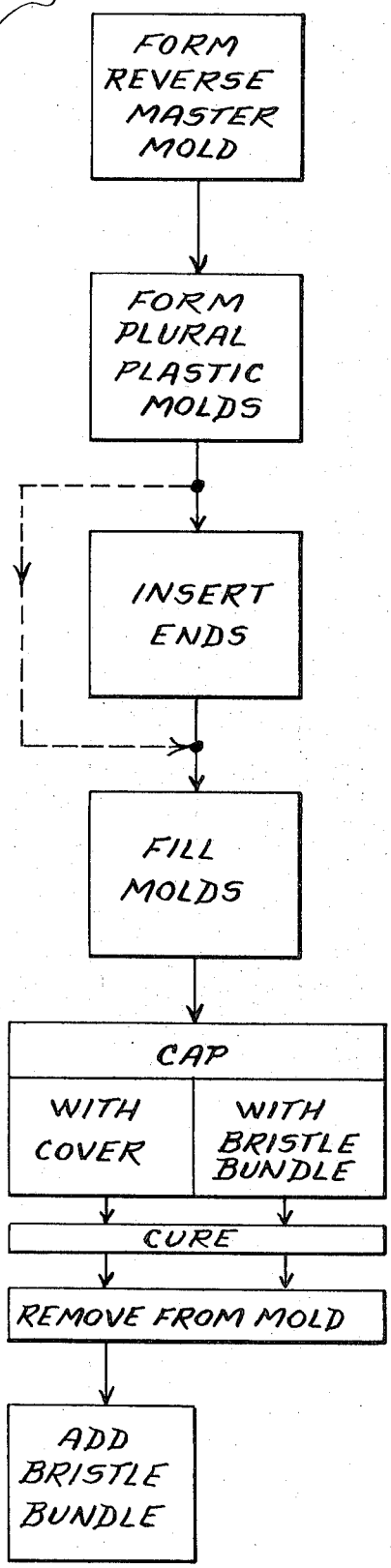
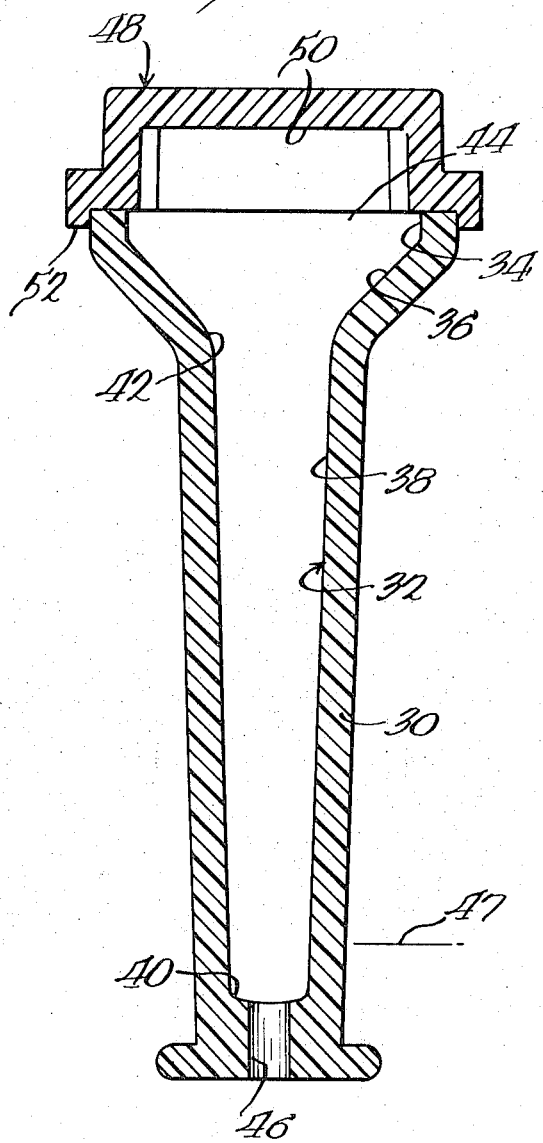

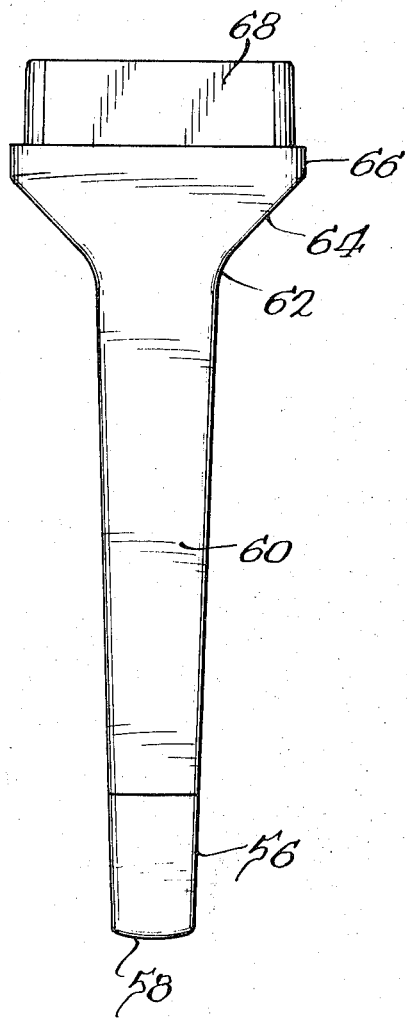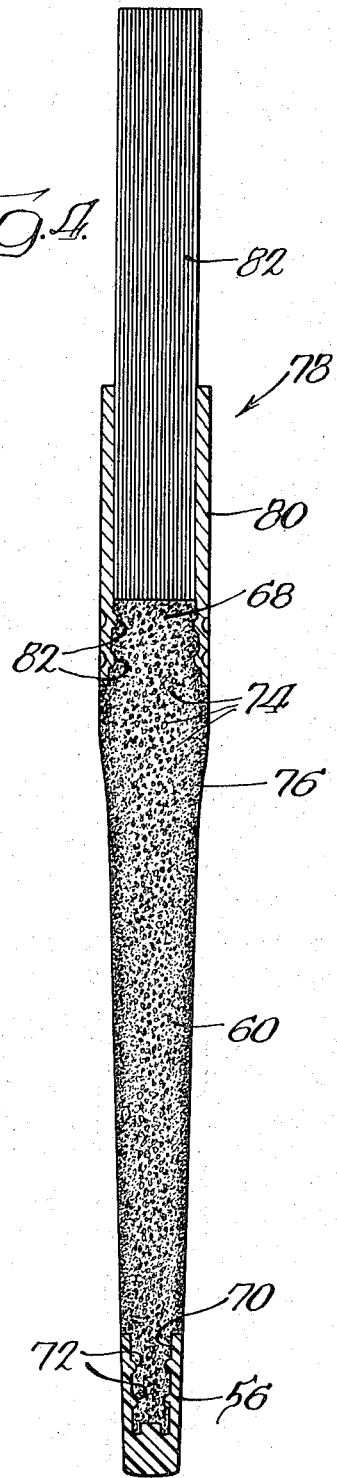

3,819,779
PAINT BRUSHES AND HANDLES PREPARED FROM INTEGRAL-SKIN POLYURETHANE FOAM
John A. Pharris and Erik Henningsen, both c/o EZ Paintr Corporation, 4051 S. Iowa Ave., Milwaukee, Wis. 53207
Filed July 19, 1971, Ser. No. 163,623
Int. Cl. B29d 27/00
U.S. Cl. 264—45                                                    7 Claims

ABSTRACT OF THE DISCLOSURE

A plastic molded paint brush handle having a bristle bundle receiving end, a base adjacent thereto tapering upwardly from opposite sides to merge into a slightly tapering elongated handle portion to a tip that is slightly narrower than a neck portion defined by the point of merger of the base and handle portion. The handle is preferably formed of a foamed polyurethane having a density approximating that of wood and characterized by a substantially paint impervious brittle skin on its exterior. The invention also contemplates an inexpensive method of forming the same wherein a plurality of polyethylene molds are used for molding the handles and are formed from a single reverse master mold.

BACKGROUND OF THE INVENTION

This invention relates to paint brush handles and methods of forming the same.

For years, paint brush handles have been made of wood provided with a lacquer finish. In recent times, suitable wood has become increasingly expensive and frequently is in short supply. Moreover, with the increasing use of so-called "latex paint," cleaning of paint brushes has resulted in the immersion of the same into water which may cause the wood to swell and possibly rot.

As a result, numerous attempts have been made to fabricate paint brush handles using substitute materials, as for example, plastics. Most such handles are made by injection molding processes employing polyethylene plastics. However, such handles are undesirable in that they are extremely slick and difficult to grasp in any event and more so if paint drips on the handle. Furthermore, they do not possess the weight or texture characteristics of wood and therefore do not provide the "feel" of a wooden paint brush handle which is often desired by a professional painter.

SUMMARY OF THE INVENTION

It is the principal object of the invention to provide a new and improved plastic paint brush handle as well as a new and improved method of fabricating the same.

More particularly, it is an object of the invention to provide a molded paint brush handle formed of a pigmented composition to eliminate any need for painting the same, is foamed so as to have a density approximating that of wood, and has a substantially paint impervious skin.

The exemplary embodiment of the invention achieves the foregoing objects with a paint brush handle formed of foamed, molded polyurethane having a bristle bundle receiving end, a base adjacent thereto tapering upwardly from opposite sides to merge into a slightly tapering elongated handle portion to a tip. The tip is slightly narrower than the neck portion defined by the point of merger of the base and the handle portion and the polyurethane has a density approximating that of wood. Furthermore, the paint brush handle is characterized by a substantially paint impervious brittle skin on the exterior and a coloring pigment is included in the plastic to avoid any necessity of painting the handle itself.

If desired, the tip can be defined by a preformed plastic end having a ribbed, internal cavity into which the plastic is cast during the molding process. The internal cavity preferably includes inwardly extending ribs to form a good bond. In addition, a ribbed ferrule bearing a bristle bundle may be mounted on the bristle bundle receiving end and according to one embodiment, the bristle bundle receiving end may be foamed into the ribbed ferrule to provide a good bond.

An exemplary embodiment of the inventive method includes the steps of forming a reverse master mold in the desired configuration of the paint brush handle, providing a plurality of inexpensive molds formed of polyethylene and having internal cavities configured in the desired form of the paint brush handle by casting polyethylene on the reverse master mold; filling the polyethylene molds with a polyurethane composition, permitting expansion within the mold and curing the polyurethane so as to form a foamed handle with a paint impervious skin on the exterior of the handle being cast and removing the cured composition from the molds to yield a paint brush handle.

According to one embodiment, the limited venting may be accomplished by capping the mold with a cap having a cavity configured to define a bristle bundle receiving end on the cured composition.

According to another embodiment, the mold may be capped with a bristle bundle so that a bond between the handle and a ferrule on the bristle bundle will be formed during curing to yield a completed paint brush.

Other objects and advantages of the invention will become apparent from the following specification taken in conjunction with the accompanying drawings.

DESCRIPTION OF THE DRAWINGS

FIG. 1 is a flow diagram of an exemplary embodiment of a method for forming paint brush handles;

FIG. 2 is a vertical section of a plastic mold formed from a reverse master mold and capped with a cover;

FIG. 3 is a side elevation of a paint brush handle made according to one embodiment of the invention; and FIG. 4 is a vertical section of a completed paint brush made according to another embodiment of the invention.

DESCRIPTION OF THE PREFERRED EMBODIMENTS

An exemplary embodiment of a method of forming plastic paint brushes is illustrated in flow form in FIG. 1 and generally comprises the steps of forming a reverse master mold forming a plurality of plastic molds employing the reverse master mold; an optional step of inserting preformed ends or tips in the plastic molds; filling the molds with the plastic composition; capping the filled molds either with a cover or with a bristle bundle; curing the composition within the molds; removing the cured product from the mold; and if the capping step was performed by the step of capping with the cover, adding a bristle bundle to form a paint brush.

Forming a Reverse Master Mold

As mentioned generally previously, paint brush handles made according to the invention are preferably formed of polyurethane. As is well-known, the curing of polyurethane in a molding process is rather slow and therefore the molding process requires the provision of several molds to enable the same to proceed on a relatively continuous basis. Moreover, paint brushes are typically made in a number of sizes, as for example, one-half inch, one inch, two inches, three inches, etc., and, for each size, there are many different variations which require variations in handle structure. For example, the assignee of the instant application contemplates eighteen different types of three-inch brushes.

Therefore, it will be appreciated that the cost of providing conventional molds for use in the formation of polyurethane handles would be extremely expensive inasmuch as a plurality of molds would be required for each variation of a given size brush as well as for a multitude of different size brushes.

To solve this problem, the invention contemplates, as its first step, the formation of a reverse master mold for each variation of each size paint brush. The reverse master mold is configured to have an external shape in the desired shape of the paint brush handle. According to the preferred embodiment, the shape of the reverse master mold is identical to the desired shape of the handle but need not include a bristle bundle receiving end. The shape therefore is flexible within the limitations imposed by a process employing a one-piece mold (preferred to avoid the seams formed at the interfaces of the mold units when a plural mold piece process is used) to permit ejection. To this end, the narrowest end of the reverse master mold should preferably be provided with a projection so as to define an opening in the plastic mold to be formed thereon for entry of ejection means to eject the formed handle from the plastic mold.

The Formation of Plural Plastic Molds

The reverse master mold resulting from the foregoing step is then employed in forming a plurality of plastic molds of an inexpensive character. That is, the number of molds necessary to fabricate a given variation of a given size paint brush on a relatively continuous basis are then formed of an inexpensive material on the reverse master mold for further use in the process.

When polyurethane is employed as the composition from which the ultimate product is to be fabricated, conventional molding techniques required the use of a mold release agent which must be applied to the mold prior to the loading of the same with the compound to be molded. The application of the mold release agent increases the cost of the formation process by the cost of the agent itself as well as the cost of the labor or apparatus necessary to apply the agent prior to each use of the mold. In order to eliminate such cost, and in order that the plural plastic molds be formed of an inexpensive material, the instant invention contemplates that the plastic molds be formed of polyethylene to which the cured polyurethane will not bond. Thus, the surface of each polyethylene mold itself provides all mold release properties required.

When the plastic molds are formed on a reverse master mold configured in the desired form of the paint brush handle, another advantage results. Conventional two-part molding would leave a seam line on opposite sides of the paint brush handle. As a result, a finishing operation would be required to remove the seam line before the handle could be employed in a salable brush. But according to the invention, the internal cavity of each mold conforms to the configuration of the brush and no such seam will be present along the handle portion of the resulting product.

Insertion of Preformed Ends

As mentioned previously, the step of inserting preformed ends is optional but it is generally preferable in that a more aesthetically pleasing handle results and the over-all process is simplified. As mentioned above in the preceding paragraph, the plastic molds are essentially one-part molds as opposed to conventional two-part molds and it is therefore necessary to remove the handle from an open end thereof. Since the handle portion of a handle obviously cannot be as large as a base portion to which a bristle bundle is attached, for all sizes, provision is made in the mold at opposite the end from which the handle is to be ejected for the application of pressure to the handle to drive the same from the mold. Normally, this will be accomplished by an opening in the mold end opposite the end through which the handle is ejected. If a preformed end is inserted in the mold, the same acts as a seal to close such as opening and other steps need not be taken to preclude a molding composition from the flowing into the opening.

Further, while not shown herein, the end tips may be preformed with an eye or hook member so that the resulting paint brush can be hung on a hook. Obviously, a molding process employing a one-part mold would not be susceptible to the molding of such a hook or eyelet but the use of preformed ends permits the same to be employed on the resulting handle.

Filling the Molds

After the preformed ends have been inserted into the molds, the same may be filled with the composition from which the handles are to be formed. As mentioned previously, a foamed polyurethane is a preferred composition in that the resulting handle will closely simulate the weight and texture of a natural wood handle. The polyurethane employed may be of the type disclosed in U.S. Pats. 3,072,582 and 3,391,093, for example. A formulation which produces a "rigid" or "semirigid" type of foam will normally be used to give the handle the desired stiffness. Reagents for preparing such foams are commercially available, e.g., from the Cook Paint and Varnish Company, Kansas City, Mo., as two-component systems including an A component and a B component. The two components are thoroughly mixed just prior to use and they begin to react and form a foam while hardening and curing.

In one such system, the A component is a mixture of a polyether polyol, amine catalyst and silicone surfactant and a blowing agent such as Freon 11 is included in an amount of about 10% to 15% in this mixture. The B component contains a diisocyanate such as methylene-phenyl diisocyanate. In our production of brush handles, we have used a mixture of 43% of the A component and 57% of the B component. Of course, the total charge introduced into the mold will depend on the size of the mold but it should be such that when the mold is filled during expansion of the foaming ingredients the desired handle density will be provided. In order to obviate any need for lacquering or otherwise coloring the resulting handles, a coloring pigment can be included in the formulation in amounts up to about 2 to 3 percent, based on total formulation. Normally the coloring pigment will be of a different color from that of the preformed end tip to provide a pleasing contrast.

Capping the Molds

The filled molds are then capped either with a cover having a cavity defining a bristle bundle receiving end of the handle or with the bristle bundle itself. Suitable clamps may be applied as desired to retain the caps in position under expansion forces within the mold or a snap lock or other locking device can be provided between the cover and the remainder of the mold cavity. In the capped mold the bristle bundle receiving end is either formed by the cover or the handle is cast directly within the bristle bundle to result in a completed paint brush. The mold is vented, e.g., between the cover and remainder of the mold cavity or through ports in the cover, to permit air to escape with result that the resin expands and the handle attains proper density. An integral connate noncellular skin forms as the surface of the paint brush handle. This skin is tough or brittle and liquid impervious and has a texture not unlike that of wood.

Curing

After capping of the molds, the composition therein is cured by any suitable manner. Manufacturer's recommendations as to conditions should be followed. It is not unusual that the urethane compositions will expand and cure at ambient temperature merely by mixing and pouring into the mold since the reaction is exothermic and creates enough heat to keep it self-sustaining. For faster cures or with formulations requiring higher cure temperatures, the mold can be prewarmed in an oven or the like before use or heat can be applied in other ways. At least with some resin systems mold temperature control is important in achieving proper cure of the urethane coupled with desired pore formation.

Removal of the Products from the Mold

After the composition within the mold has cured to the desired degree to form a handle, it is removed from the mold. As mentioned previously, this will normally be accomplished by applying pressure to the tip of the handle from an opening in the mold to drive the handle out of the mold through an opening in the opposite end. According to a preferred embodiment, pressure may be applied to the tip of the handle by a mechanical element pushed through the opening in the mold.

Adding a Bristle Bundle

Upon removal of the handles from the mold, if they were not formed with a bristle bundle in the capping step, a bristle bundle may be added to the bristle bundle receiving end defined thereon by the cavity in the cover in any conventional manner.

With the foregoing steps of the method in mind, further details of the mold and various steps in the process along with the product formed will now be discussed in conjunction with the showings of FIGS. 2, 3, and 4.

Referring specifically to FIG. 2, a typical plastic mold 30 formed of polyethylene is shown. The same includes an internal cavity 32 defined by the shape of the reverse master mold. The upper cavity end includes a base defining portion 34 which tapers sharply at 36 to merge into a handle defining portion 38 terminating in a tip defining portion 40. A neck defining portion 42 is at the point of merger of the base defining portion 34 and the handle defining portion 38.

The tapers are such that the cured composition within the mold 30 may be easily ejected through an opening 44 when pressure is applied to the tip of the handle therein through an opening 46 at the tip defining portion 40.

When preformed ends are used, the same are introduced into the cavity 32 and abutted against the tip defining portion 40 to close the opening 46 so that the molding composition cannot pass therethrough. Alternatively, the lower end of the plastic mold 30 may terminate at a level indicated by the line 47 in FIG. 2. For such a construction, it is necessary that the preformed ends be of sufficient length so that they will lodge within the mold above the resulting open end with a portion of the same projecting therethrough. When such a construction is used, easier ejection of the formed handle results as it is not necessary to apply pressure through the opening 46 for ejection. Rather, it is necessary only to apply pressure against that portion of the preformed end extending from the mold 30.

FIG. 2 also illustrates a cover, generally designated 48, which may be used in the step of capping the mold. The same includes an inner cavity 50 into which the composition may foam and cure for defining a bristle bundle receiving end on the paint brush. Normally, the cavity 50 will be configured generally in the shape of the widest portion of the base as at 34 but of slightly lesser dimensions so that when a bristle bundle including a ferrule is secured thereto, the surface of the base of the handle will smoothly flow into the surface of the ferrule.

The cap 48 also includes a peripheral flange 52 which tends to frictionally lock with the upper end of the mold 30 to hold the cap 48 securely thereon and to restrict venting for the purpose mentioned earlier.

Referring now to FIG. 3, one form of paint brush handle made according to the invention is illustrated. The same includes a preformed end 56 serving as a tip 58 on a handle portion 60. The handle portion tapers slightly to a neck portion 62 and then flares sharply outwardly as at 64 to a base 66 and terminates in a bristle bundle receiving end 68.

As best seen in FIG. 4, the preformed end 56 includes an internal cavity 70 including a plurality of peripheral ribs 72 for firmly locking the end 56 on the handle.

FIG. 4 also illustrates a completed paint brush formed according to the foregoing method. As can be seen, the same is cellular including voids as at 74 with the size of the voids decreasing as the exterior of the handle is approached. At the surface thereof, a hard, brittle skin 76, which is generally moisture impervious, is formed during the curing process. The bristle bundle receiving end 68 mounts a bristle bundle, generally designated 78 having a conventional ferrule 80 mounting a plurality of bristles 82.

At the point of connection of the ferrule 80 to the bristle bundle receiving end 68, the ferrule 80 is provided with a plurality of circumferential, inwardly directed ribs 82 which may either be pressed into the bristle bundle receiving end 68 after the same is formed through use of the cover 48 or which may be preformed therein to firmly lock the bristle bundle 78 on the handle when the composition foams thereinto and cures.

From the foregoing, it will be seen that the invention provides a method whereby plastic paint brush handles may be economically formed. Moreover, according to the preferred embodiment, the handles may be formed of polyurethane to have a texture and density approximating that of wood and which further includes a liquid impervious skin on the exterior.

What is claimed is:

1. A method of forming paint brushes comprising the steps of:
   (a) forming a reverse master mold in the desired configuration of a paint brush handle;
   (b) providing a plurality of molds devoid of longitudinal seams and having internal cavities configured in said desired form of a paint brush handle by casting a mold forming material on said reverse master mold each of said molds having an internal release surface;
   (c) filling said molds with a foamable plastic composition;
   (d) capping each mold with a preassembled bristle bundle;
   (e) foaming said composition to the approximate density of wood and curing said composition within said molds while forming a moisture and paint resistant skin thereon whereby the plastic composition will foam into the bristle bundle and cure within the same to form a paint brush; and
   (f) removing the cured plastic composition from said molds to yield paint brush handles.

2. A method of forming paint brushes comprising the steps of:
   (a) providing a mold devoid of longitudinal seams having an internal cavity configured in the desired form of a paint brush handle and having an internal release surface;
   (b) filling said mold with a foamable plastic composition;
   (c) capping the filled mold with a bristle bundle whereby the plastic composition will foam into the bristle bundle;
   (d) foaming said composition and curing said composition within said mold while forming a moisture and paint resistant skin thereon; and
   (e) removing the cured plastic composition from said mold to yield a paint brush.

3. A method of forming paint brushes comprising the steps of:
   (a) forming a reverse master mold in the desired configuration of a paint brush handle;
   (b) providing a plurality of molds devoid of longitudinal seams and having internal cavities configured in said desired form of a paint brush handle by casting a mold forming material on said reverse master mold each of said molds having an internal release surface;

(c) filling said molds with a foamable plastic composition;
(d) capping the filled molds with bristle bundles whereby the plastic composition will foam into the bristle bundles;
(e) foaming said composition to the approximate density of wood and curing said composition within said molds while forming a moisture and paint resistant skin thereon; and
(f) removing the cured plastic composition from said molds to yield paint brushes.

4. A method of forming a paint brush handle comprising the steps of:
(a) providing a paint brush handle mold having a cavity devoid of longitudinal seams with an open mouth end at the cavity portion defining the base for the bristle bundle receiving end element of the brush handle as the widest part of the handle and extending from said open mouth as an internal cavity portion tapering inwardly from opposite sides during its extent to the other end of the mold, said other end of the mold having an ejection opening and said mold cavity having an internal release surface providing all mold release properties required for each use of the mold;
(b) filling said mold with a foamable plastic composition;
(c) foaming said composition and curing said composition within said mold while forming a moisture and paint resistant skin on the cured composition in the form of the paint brush handle; and
(d) ejecting the paint brush handle from said mold through said mouth by applying pressure to the tip of the handle at said ejection opening to drive the handle from the mold in the absence of separation of said mold longitudinally.

5. The method of claim 4 wherein step (b) is followed by and step (c) is preceded by the step of capping each mold to restrict expansion to form the paint impervious skin on the handle.

6. The method of claim 4 including between steps (b) and (c), the step of capping the mold by placing a cap on the mouth end of the mold, the cap having an internal cavity configured to define a bristle bundle receiving end on the cured composition.

7. A method of forming a paint brush handle comprising the steps of:
(a) providing a paint brush handle mold having a cavity devoid of longitudinal seams with an open mouth end at the cavity portion defining the base for the bristle bundle receiving end element of the brush handle as the widest part of the handle and extending from said open mouth as an internal cavity portion tapering inwardly from opposite sides during its extent to the other end of the mold, said other end of the mold having an ejection opening and said mold cavity having an internal release surface providing all mold release properties required for each use of the mold;
(b) inserting a preformed plastic paint brush tip through said mouth to rest at said other end of the cavity closing said ejection opening;
(c) filling said mold with a foamable plastic composition;
(d) foaming said composition and curing said composition within said mold while forming a moisture and paint resistant skin on the composition; and
(e) ejecting the cured, foamed plastic composition from said mold through said mouth by engaging said plastic tip with a mechanical element at said ejection opening and pushing said plastic tip toward the mouth.

References Cited
UNITED STATES PATENTS

| | | | |
|---|---|---|---|
| 2,854,684 | 10/1958 | Hardman | 300—12 X |
| 3,182,104 | 5/1965 | Cwik | 264—45 |
| 3,425,084 | 2/1969 | St. Lawrence | 300—21 X |
| 3,046,177 | 7/1962 | Hankins | 264—338 X |
| 2,664,582 | 1/1954 | Kammann | 15—193 X |
| 2,274,002 | 3/1940 | Saltzman | 15—93 X |
| 3,142,081 | 7/1964 | Hartz | 15—193 X |
| 3,386,119 | 6/1968 | Shulman | 300—21 X |
| 3,268,636 | 8/1966 | Angell | 264—2.5 AZX |
| 3,306,960 | 2/1967 | Weissmann et al. | 264—Dig. 14 |
| 3,645,975 | 2/1972 | Bernstein | 260—75 NE |
| 3,703,571 | 11/1972 | Roberts | 264—45 |

FOREIGN PATENTS

| | | | |
|---|---|---|---|
| 847,436 | 8/1952 | Germany | 300—21 |

H. S. COCKERAM, Primary Examiner

U.S. Cl. X.R.

15—143 R, 193; 260—2.5 AZ, 53, 334, Dig. 14; 300—21